(12) United States Patent  
Fujimoto et al.

(10) Patent No.: US 7,051,592 B2
(45) Date of Patent: May 30, 2006

(54) ANGULAR VELOCITY SENSOR

(75) Inventors: Katsumi Fujimoto, Toyama-ken (JP); Masato Koike, Toyama-ken (JP); Hironari Yamamoto, Toyama-ken (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 107 days.

(21) Appl. No.: 10/889,190

(22) Filed: Jul. 12, 2004

(65) Prior Publication Data

US 2005/0066727 A1    Mar. 31, 2005

(30) Foreign Application Priority Data

Sep. 25, 2003   (JP) ............................. 2003-332840

(51) Int. Cl.
*G01P 9/04* (2006.01)

(52) U.S. Cl. ................................ 73/504.16; 310/370

(58) Field of Classification Search ............. 73/504.16; 310/329, 348, 370

See application file for complete search history.

(56) References Cited

U.S. PATENT DOCUMENTS 6,647,786 B1 *  11/2003  Ohta et al. ............... 73/504.16
6,799,461 B1 *  10/2004  Fujimoto et al. ........ 73/504.16

FOREIGN PATENT DOCUMENTS

JP          11-230758        8/1999

* cited by examiner

*Primary Examiner*—John E. Chapman
(74) *Attorney, Agent, or Firm*—Keating & Bennett, LLP

(57) ABSTRACT

An angular velocity sensor includes a tuning-fork resonator having prongs, a supporting substrate having the tuning-fork resonator mounted thereon, and a casing accommodating the tuning-fork resonator. The base ends of the prongs constitute a base. A principal surface of the supporting substrate and a principal surface of the tuning-fork resonator are opposed to each other. The supporting substrate supports the prongs at the base so that the prongs vibrate. The supporting substrate has a first slit. The first slit is open at one end substantially in the center of a side that is substantially perpendicular to the longitudinal direction of the prongs, extends in the longitudinal direction of the prongs, and divides the supporting substrate into substrate components corresponding to the prongs. The substrate components are fixed to the casing at non-vibrating portions present in two sides extending in the longitudinal direction of the prongs.

13 Claims, 10 Drawing Sheets

ANGULAR VELOCITY SENSOR

BACKGROUND OF THE INVENTION

1. Field of the Invention

The present invention relates to angular velocity sensors, and in particular, relates to a supporting structure of a tuning-fork resonator used in an angular velocity sensor.

2. Description of the Related Art

One known angular velocity sensor is disclosed in Japanese Unexamined Patent Application Publication No. H11-230758 (hereinafter referred to as Patent Document 1). This angular velocity sensor (not shown) has a tuning-fork resonator and a casing accommodating the tuning-fork resonator. The tuning-fork resonator includes a pair of parallel prongs arranged such that the prongs are connected together at one end thereof. The tuning-fork resonator is accommodated in the casing so that the connection portion of the prongs is fixed to a seat on a bottom surface of the casing and the connection portion is a non-vibrating portion (node). This tuning-fork resonator fundamentally undergoes vibration wherein the tips (open ends) of the prongs open and close during driving, i.e., vibration in which the open ends of the prongs move in together and out together. This vibration is referred to as parallel vibration.

When an angular velocity about a rotational axis in the longitudinal direction of the prongs, i.e., the longitudinal direction of the tuning-fork resonator, is applied to the tuning-fork resonator undergoing parallel vibration, another vibration in which each of the prongs vibrates oppositely in a direction that is perpendicular to principal surfaces of the tuning-fork resonator is generated by the Coriolis force. This vibration is referred to as asymmetrical out-of-plane vibration. The principal surfaces of the tuning-fork resonator are two surfaces defined by the longitudinal direction and lateral direction of the prongs, which are arranged parallel to each other.

For example, when a tip of a first prong moves in one direction (upward) that is perpendicular to the principal surfaces of the tuning-fork resonator, a tip of a second prong moves in another direction (downward). Therefore, detecting and comparing the direction and the amount of asymmetrical out-of-plane vibration in each of the prongs enables detection of the direction of rotation and angular velocity applied to the tuning-fork resonator.

In the angular velocity sensor disclosed in Patent Document 1, to reduce the profile of the angular velocity sensor, the principal surfaces of the tuning-fork resonator and the bottom surface of the casing are opposed to each other, and a connection portion of the tuning-fork resonator is directly fixed to a seat in the casing. In this structure, however, the connection portion of the tuning-fork resonator effectively functions as a non-vibrating portion in parallel vibration, but it does not effectively function in asymmetrical out-of-plane vibration generated by application of an angular velocity.

According to the investigation conducted by the inventors of the present invention and others, it has been established that, in the angular velocity sensor of Patent Document 1, the connection portion of the tuning-fork resonator to which an angular velocity is applied, especially both edges of the connection portion in the width direction, undergoes torsional vibration that is greater than the center thereof. Therefore, it has been determined that asymmetrical out-of-plane vibration generated by the application of an angular velocity to the tuning-fork resonator is poorly energy-trapped, and the asymmetrical out-of-plane vibration leaks from the connection portion of the tuning-fork resonator to the casing via the seat.

In this structure, even if the resonance frequency or detection accuracy of the tuning-fork resonator is adjusted in advance, the resonance frequency or detection accuracy of the angular velocity sensor varies from product to product and inevitably decreases after the casing accommodating the tuning-fork resonator is fixed to a circuit board. Due to insufficient blocking of vibration, energy leaks outside. This causes a poor Q of the tuning-fork resonator, thus failing to ensure a high sensitivity. As a result, the impedance during detection is disadvantageously reduced.

FIGS. 9 and 10 show a combined structure of a tuning-fork resonator and a supporting substrate included in an angular velocity sensor that can overcome the above-described disadvantages. FIG. 9 is an exploded perspective view of the combined structure. FIG. 10 is a perspective view of the combined structure, as seen from the back side.

Specifically, the angular velocity sensor has a bimorph tuning-fork resonator 51 in which base ends of a pair of parallel prongs 53 are fixed to a support 54. In the tuning-fork resonator 51, a pair of piezoelectric substrates are polarized oppositely in the thickness direction and are bonded together, a pair of driving external electrodes 57 are separately disposed in parallel on one surface of each of the prongs 53, which are divided by a slit 55, and common external electrodes 56 are disposed on the other surfaces of the prongs 53. The angular velocity sensor having the above-described structure is disclosed in Japanese Unexamined Patent Application Publication No. 2004-061486.

This angular velocity sensor further includes a supporting substrate 52 on which the tuning-fork resonator 51 is mounted and a casing (not shown) accommodating the tuning-fork resonator 51 by fixing the supporting substrate 52 to the casing. The tuning-fork resonator 51 is mounted on the supporting substrate 52 such that a principal surface of the supporting substrate 52 and a principal surface of the tuning-fork resonator 51 are opposed to each other. The supporting substrate 52 supports the prongs 53 at a support 54 acting as a base to which base ends of the prongs 53 are fixed so that the prongs 53 can vibrate. In this angular velocity sensor, after the tuning-fork resonator 51 is mounted on the supporting substrate 52 and then the resonance frequency and detection accuracy are adjusted in this combined structure, the tuning-fork resonator 51 is accommodated in the casing by fixing the supporting substrate 52 to the casing.

In this angular velocity sensor, it is possible that a non-vibrating portion of the supporting substrate 52 to which vibration would leak from the tuning-fork resonator 51 is identified in advance and the supporting substrate 52 is fixed to the casing at the identified non-vibrating portion. In this structure, even if asymmetrical out-of-plane vibration leaks from the tuning-fork resonator 51 to the supporting substrate 52, the vibration does not leak from the supporting substrate 52 to the casing. As a consequence, the various disadvantages described in Patent Document 1 would be solved.

However, according to the investigation conducted by the inventors of the present invention and others, it has been established that a non-vibrating portion S of the supporting substrate 52 of the angular velocity sensor is recognized only in the substantially central portion of the supporting substrate 52 in the longitudinal direction of the tuning-fork resonator 51 mounted thereon. Outer regions of the supporting substrate 52 vibrate so as to rotate about the substantially central portion of the supporting substrate 52 and undergo displacement, as shown in FIG. 10. Therefore, in the angular velocity sensor having this structure, the non-vibrating portion S of the supporting substrate 52 must be fixed.

The arrows illustrated in FIG. 10 represent the directions and the amounts of displacements of areas (corners) of the supporting substrate 52 at a certain point in time during operation. As is apparent from FIG. 10, the supporting substrate 52 vibrates so as to rotate about the non-vibrating portion S.

However, fixing the non-vibrating portion S recognized in the substantially central portion of the supporting substrate 52 while isolating the outer regions of the supporting substrate 52 may cause the fixing portion to interfere with mounting of other necessary units, such as a circuit unit, or to prevent miniaturization of the angular velocity sensor. In other words, since the supporting substrate 52 does not have a non-vibrating portion S in the outer region, the supporting substrate 52 cannot be fixed to the casing at the outer region.

SUMMARY OF THE INVENTION

In order to solve the problems described above, preferred embodiments of the present invention provide an angular velocity sensor in which a supporting substrate having a tuning-fork resonator mounted thereon is fixed to a casing and has non-vibrating portions in outer regions thereof. In this angular velocity sensor, the supporting substrate can be fixed readily and reliably to the casing at the non-vibrating portion.

An angular velocity sensor according to a preferred embodiment of the present invention has a tuning-fork resonator having a pair of prongs arranged in parallel with each other, base ends of the prongs being fixed and constituting a base, a supporting substrate mounting the tuning-fork resonator so that a principal surface of the supporting substrate and a principal surface of the tuning-fork resonator are opposed to each other, the principal surface of the tuning-fork resonator being a surface defined by the longitudinal direction and the lateral direction of the prongs, the supporting substrate supporting the prongs at the base so that the prongs vibrate, and a casing accommodating the tuning-fork resonator by fixing the supporting substrate to the casing. The supporting substrate has a first slit opening at one end substantially in the approximate center of a side that is substantially perpendicular to the longitudinal direction of the prongs of the tuning-fork resonator. The first slit extends in the longitudinal direction of the prongs and divides the supporting substrate into substrate components corresponding to the prongs. The substrate components are fixed to the casing at non-vibrating portions present in two sides of the substrate components, the two sides extending in the longitudinal direction of the prongs.

According to the angular velocity sensor, since the supporting substrate on which the tuning-fork resonator is mounted has the first slit dividing the supporting substrate into the substrate components corresponding to the prongs, the non-vibrating portions are present in the outer regions of the two sides of the substrate components of the supporting substrate, the two sides extending in the longitudinal direction of the prongs, i.e., in the outer regions of the substrate components of the supporting substrate. As a result, the supporting substrate can be fixed to the casing at the non-vibrating portions. Therefore, even if vibration leaks from the tuning-fork resonator to the supporting substrate, the vibration does not leak from the supporting substrate to the casing.

Moreover, since the supporting substrate is fixed to the casing at the outer regions of the substrate components, the substantially central portion of the supporting substrate does not interfere with mounting of other necessary units and does not prevent miniaturization of the angular velocity sensor. Additionally, the resonance frequency and the detection accuracy of the angular velocity sensor do not vary from product to product, thereby advantageously increasing the impedance during detection.

In the angular velocity sensor, the supporting substrate may have a first notch intersecting substantially at the center of the first slit in the longitudinal direction and extending in the lateral direction of the prongs of the tuning-fork resonator.

According to this angular velocity sensor, the supporting substrate has the first slit and the first notch intersected by the first slit. As a result, the non-vibrating portions are present in the outer regions of the two sides of the substrate components of the supporting substrate, the two sides extending in the longitudinal direction of the prongs, i.e., in the outer regions of the substrate components of the supporting substrate. Therefore, the above-described advantageous effects are achieved.

In the angular velocity sensor, the substrate components may have second slits arranged substantially parallel to the first slit, and each of the second slits is open at one end in the other side opposite to the one side in which the first slit opens.

According to this angular velocity, the supporting substrate has the second slits arranged substantially parallel to the first slit, in addition to the first slit dividing the supporting substrate into the substrate components, and openings of the second slits are opposite to an opening of the first slit. As a result, the non-vibrating portions are reliably present in the substrate components of the supporting substrate outside the tuning-fork resonator. Therefore, the above-described advantageous effects are achieved.

In the angular velocity sensor, the substrate components may have second notches intersecting substantially at the centers of the second slits in the longitudinal direction and extending in the lateral direction of the prongs of the tuning-fork resonator.

According to the angular velocity, the substrate components of the supporting substrate have the second slits and the second notches intersecting the second slits. As a result, the non-vibrating portions are present in the substrate components of the supporting substrate outside the tuning-fork resonator. Therefore, the above advantageous effects are achieved.

Other features, elements, characteristics and advantages of the present invention will become more apparent from the following detailed description of preferred embodiments thereof with reference to the attached drawings.

DETAILED DESCRIPTION OF PREFERRED EMBODIMENTS

A unique construction having non-vibrating portions in outer regions of a supporting substrate having a tuning-fork resonator mounted thereon and fixed to a casing is achieved by a significantly simplified structure.

First Preferred Embodiment

Figure 1:
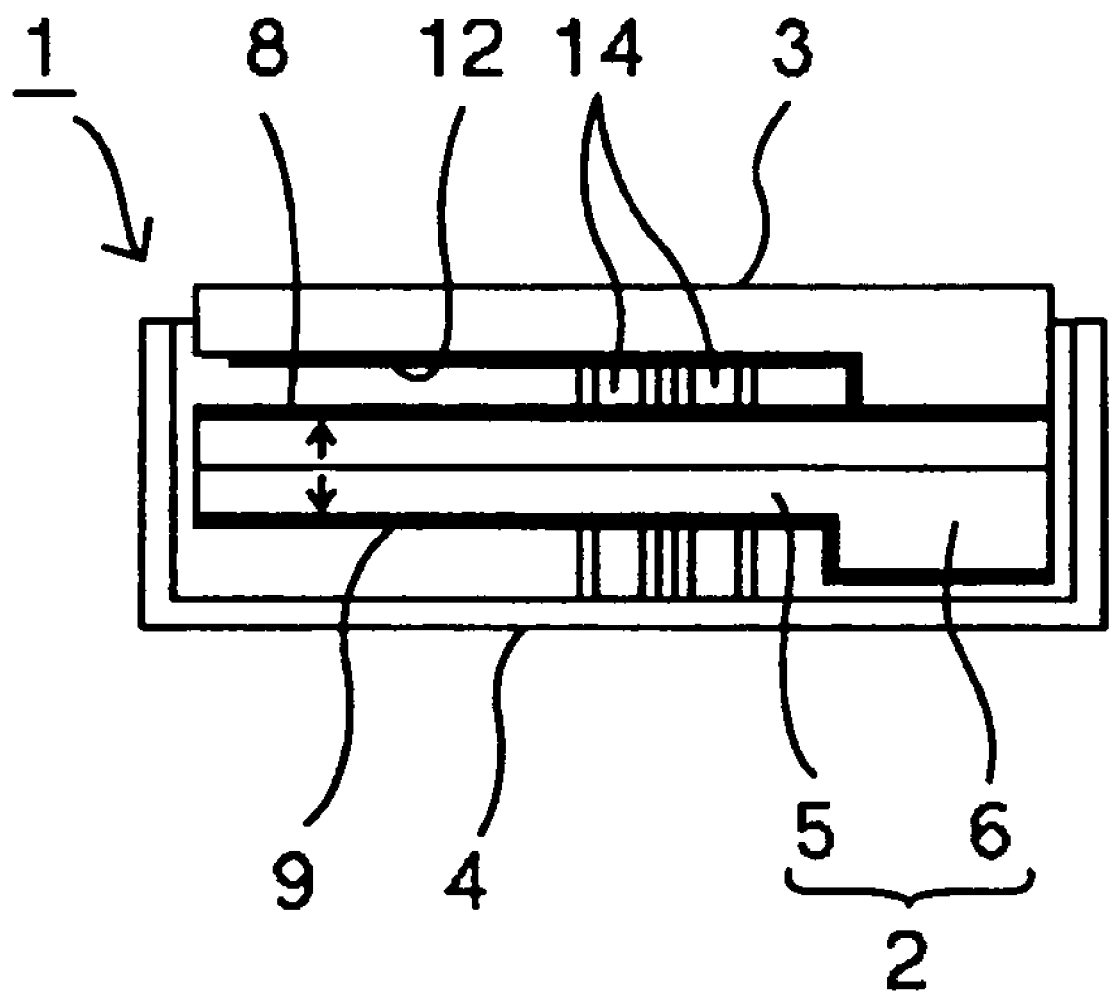
FIG. 1 is a section view showing the overall structure of an angular velocity sensor according to a first preferred embodiment of the present invention.
Figure 2:
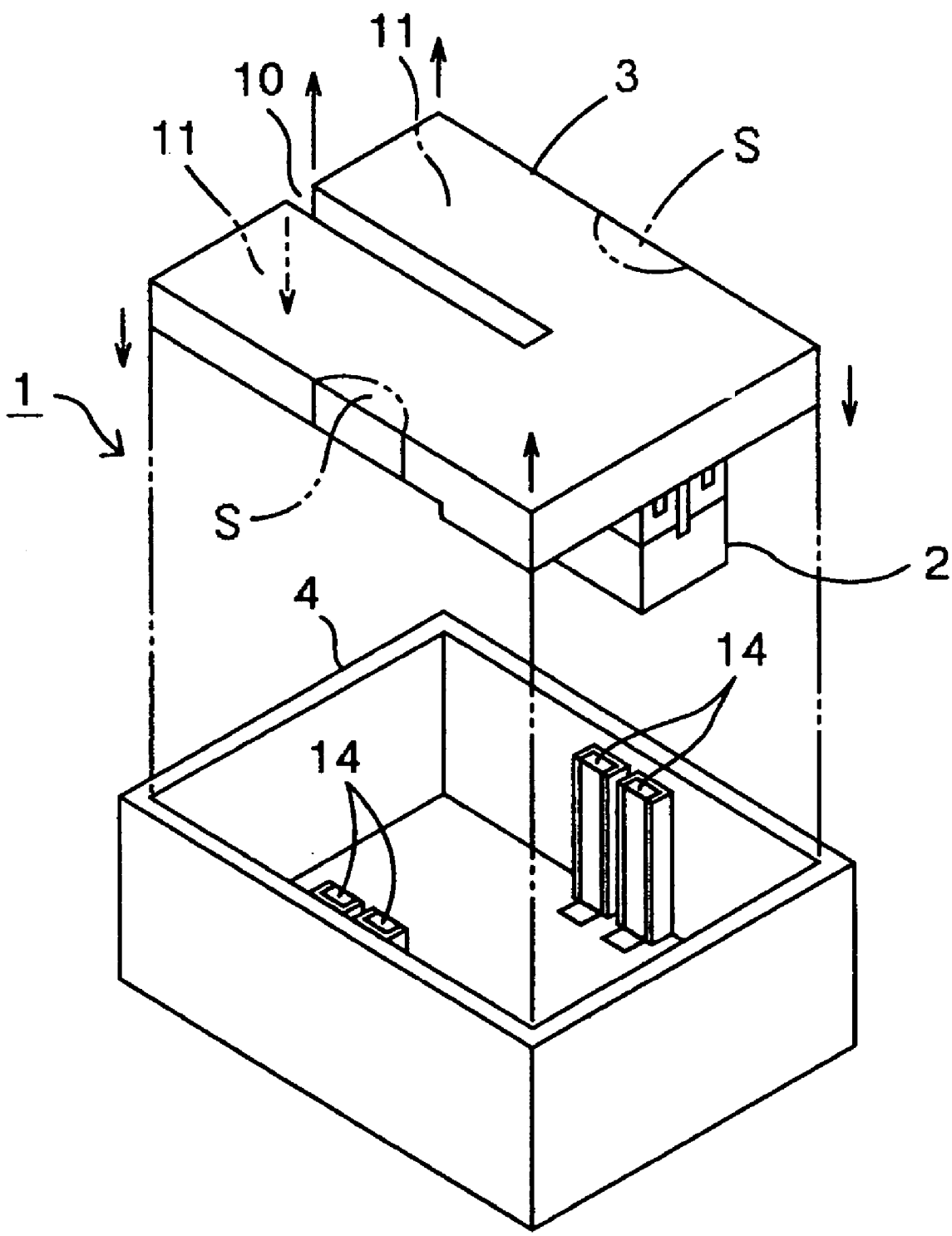
FIG. 2 is an exploded perspective view showing the overall structure of the angular velocity sensor according to the first preferred embodiment of the present invention.
Figure 3:
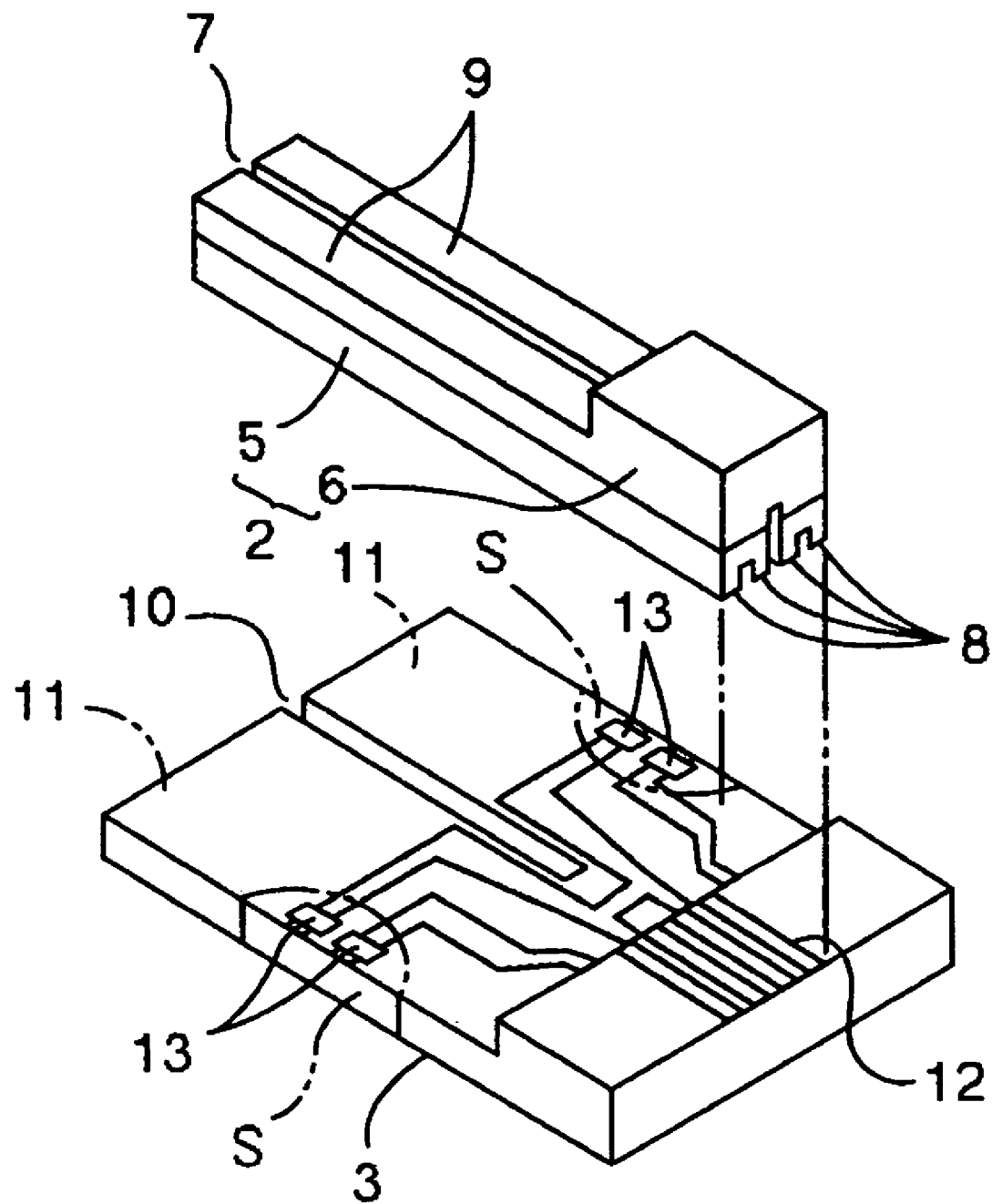
FIG. 3 is an exploded perspective view showing a combined structure of a tuning-fork resonator and a supporting substrate included in the angular velocity sensor according to the first preferred embodiment of the present invention.
Figure 4A:
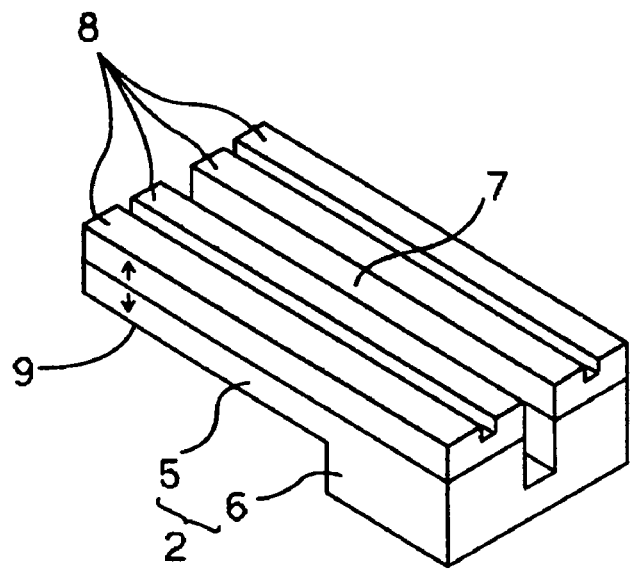
FIGS. 4A to 4C are external perspective views of the tuning-fork resonator and modifications thereof included in the angular velocity sensor according to the first preferred embodiment of the present invention.
Figure 4B:
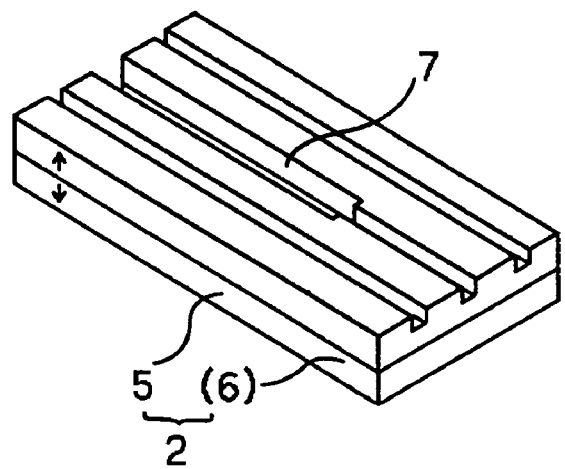
Figure 4C:
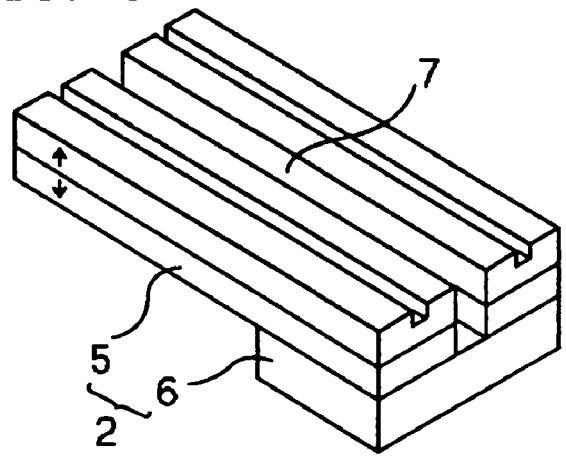
Figure 5:
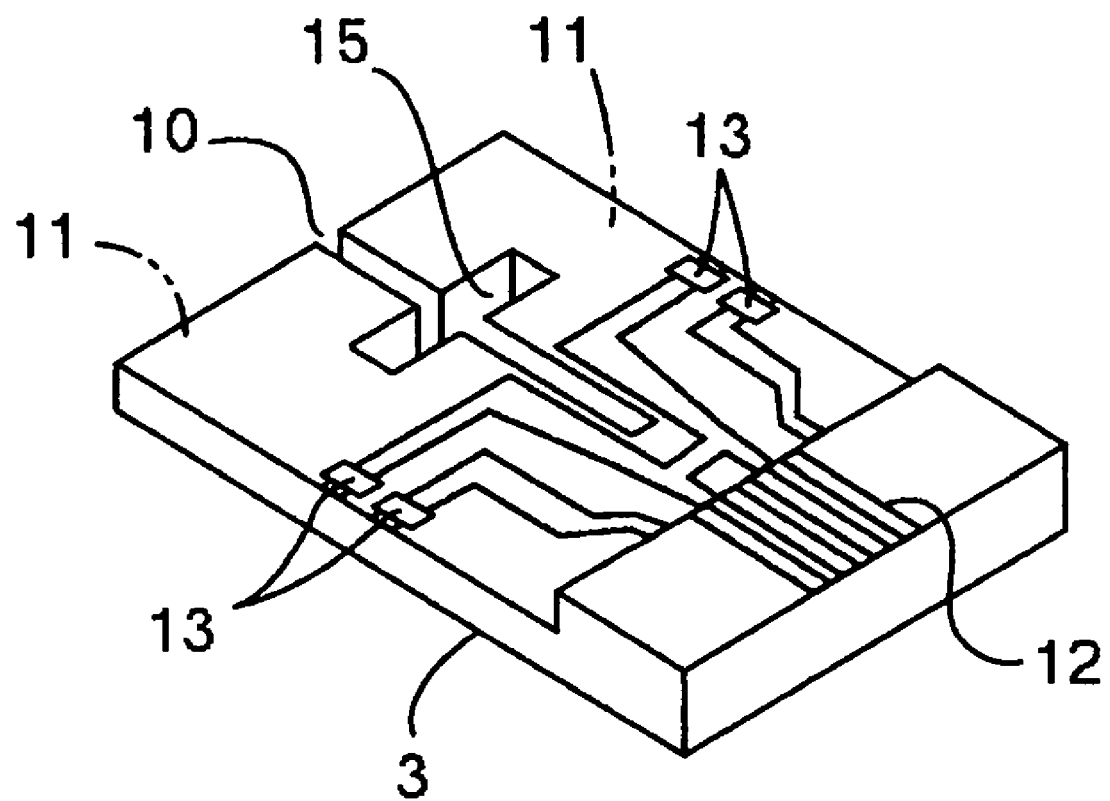
FIG. 5 is an external perspective view of a modification of the supporting substrate included in the angular velocity sensor according to the first preferred embodiment of the present invention.

FIG. 1 is a section view showing the overall structure of an angular velocity sensor according to a first preferred embodiment. FIG. 2 is an exploded perspective view showing the angular velocity sensor. FIG. 3 is an exploded perspective view showing a combined structure of a tuning-fork resonator and a supporting substrate included in the angular velocity sensor. FIGS. 4A to 4C are external perspective views of the tuning-fork resonator and modifications thereof included in the angular velocity sensor. FIG. 5 is an external perspective view of a modification of the supporting substrate included in the angular velocity sensor. FIG. 2 shows the combined structure of a tuning-fork resonator 2 and a supporting substrate 3 of an angular velocity sensor 1, as seen from the back side.

As shown in FIGS. 1 and 2, the angular velocity sensor 1 has the tuning-fork resonator 2 and the supporting substrate 3. In the tuning-fork resonator 2, a pair of prongs 5 are arranged parallel or substantially parallel to each other, and base ends of the prongs are fixed to a support 6. The tuning-fork resonator 2 is mounted on the supporting substrate 3 so that a principal surface of the supporting substrate 3 and a principal surface of the prongs 5 extending in the longitudinal direction and lateral direction of the prongs 5 of the tuning-fork resonator 2 are opposed to each other. The supporting substrate 3 supports the prongs 5 at the support 6, which is a base for fixing the base ends of the prongs 5, so that each of the prongs 5 can vibrate.

The angular velocity sensor 1 has the casing 4 in which the tuning-fork resonator 2 is accommodated by fixing the supporting substrate 3 to the casing 4. In the angular velocity sensor 1, the tuning-fork resonator 2 mounted on the supporting substrate 3 faces the bottom of the casing 4.

Figure 9:
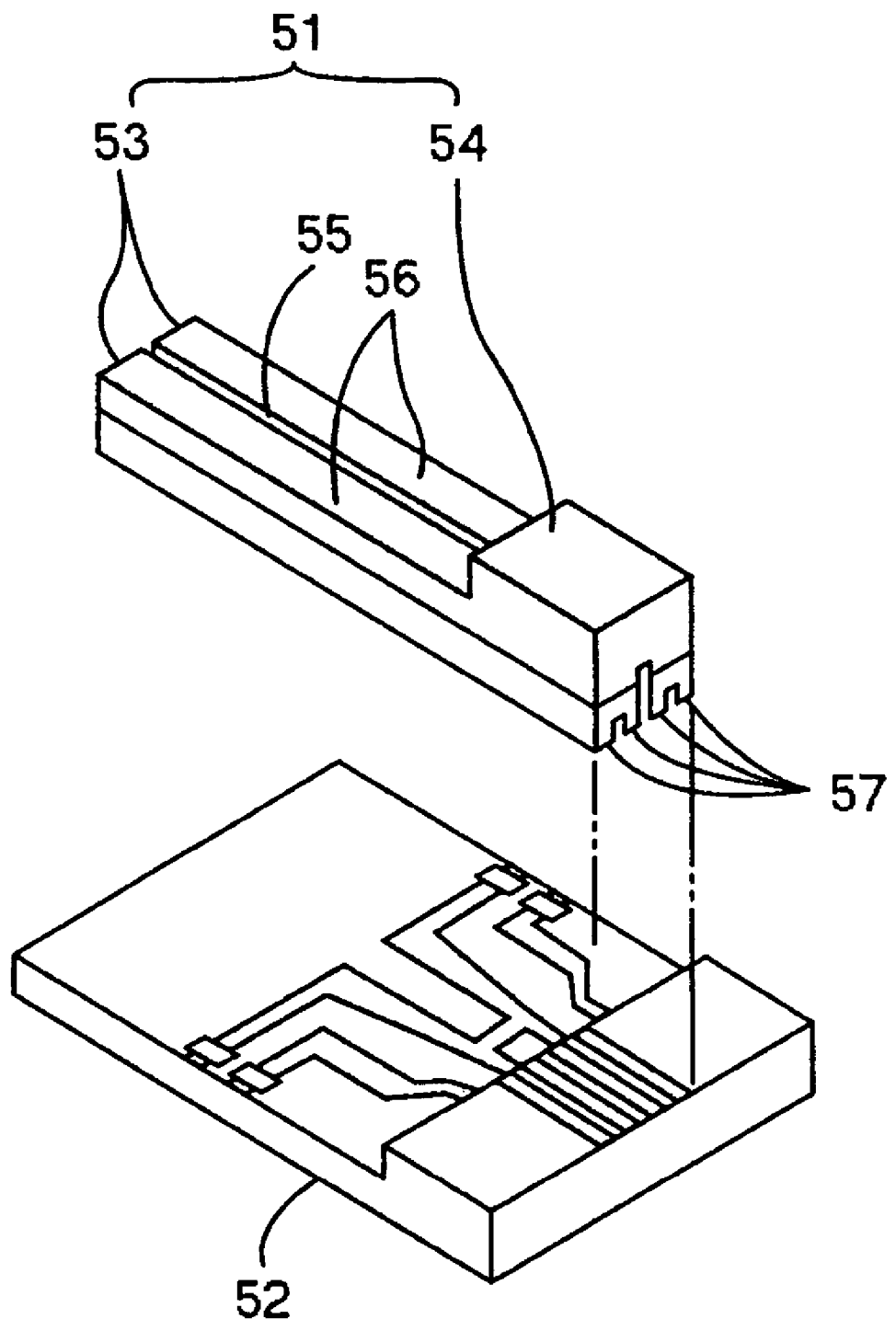
FIG. 9 is an exploded perspective view showing a combined structure of a tuning-fork resonator and a supporting substrate of a known angular velocity sensor.
Figure 10:
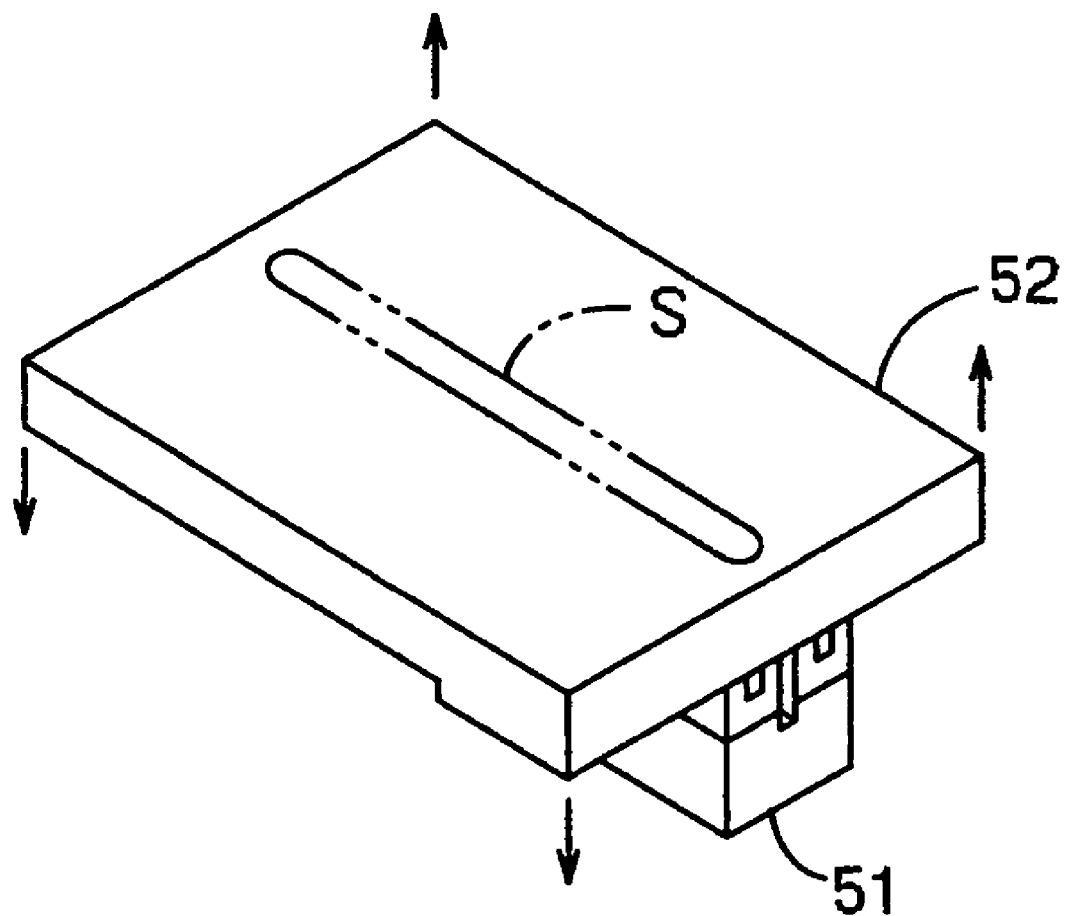
FIG. 10 is a perspective view of the combined structure of the tuning-fork resonator and the supporting substrate, as seen from the back side.

The tuning-fork resonator 2 is preferably a bimorph type in which a pair of piezoelectric substrates, which are polarized oppositely in the thickness direction, are bonded together. As shown in FIGS. 3 and 4A, the pair of prongs 5 are separated by a slit 7, and a pair of driving external electrodes 8 is arranged preferably in parallel on one surface of each of the prongs 5. Common external electrodes 9 are disposed on the other surfaces of the prongs 5, extending to the support 6. The tuning-fork resonator 2 shown in FIGS. 3 and 4A is preferably the same as the tuning-fork resonator 51 shown in FIG. 9. Similarly, the prongs 5, the support 6, the slit 7, the driving external electrodes 8, and the common external electrodes 9 are preferably the same as the prongs 53, the support 54, the slit 55, the driving external electrodes 57, and the common external electrodes 56, respectively.

The tuning-fork resonator 2 undergoes asymmetrical out-of-plane vibration, in addition to parallel vibration, as is the case with the tuning-fork resonator 51. In the tuning-fork resonator 2, the driving external electrodes 8 and the common external electrodes 9 reach the support 6 constituting the base. Therefore, if needed, all terminal electrodes of the driving external electrodes 8 and the common external electrodes 9 may be disposed on one surface of the base, for example, via an end surface of the base. In this case, mechanically fixing the tuning-fork resonator 2 to the supporting substrate 3 enables an electrical connection therebetween, thus advantageously eliminating the necessity to connect with wires.

As shown in FIGS. 2 and 3, the supporting substrate 3 has a first slit 10. The first slit 10 is open at one end in the substantially central portion of one of two sides that are substantially perpendicular to the longitudinal direction of the prongs 5 of the tuning-fork resonator 2 and extends in the longitudinal direction of the prongs 5. The supporting substrate 3 is divided into substrate components 11 by the first slit 10. The substrate components 11 individually correspond to the prongs 5 of the tuning-fork resonator 2.

Circuit patterns 12 are provided on a surface (on which the tuning-fork resonator 2 is disposed) of the supporting substrate 3, which is divided into the substrate components 11 by the first slit 10. The circuit patterns 12 are bonded to the driving external electrodes 8 with conductive adhesive or other suitable material or elements. The width of the first slit 10 is not limited, and therefore, the first slit 10 may be larger in width than the tuning-fork resonator 2.

A pair of substrate electrodes 13 is disposed on each of the substantially central portions of outer regions of the substrate components 11 of the supporting substrate 3, i.e., of two sides of the substrate components 11 of the supporting substrate 3 in the longitudinal direction of the prongs 5 of the tuning-fork resonator 2. The substrate electrodes 13 individually come into contact with external leading electrodes 14 provided on the casing 4 and are bought into conduction. This preferred embodiment has the first slit 10 in a single line shape, but the shape of the slit is not limited to this. For example, like a modification of the supporting substrate 3 shown in FIG. 5, a first notch 15 intersecting substantially at the center of the first slit 10 in the longitudinal direction and extending in the lateral direction of the prongs 5 of the tuning-fork resonator 2 may be provided.

According to a vibration analysis using the finite-element method conducted by the inventors of the present invention and others, it has been established that a certain amount of asymmetrical out-of-plane vibration leaks from the tuning-fork resonator 2 to the supporting substrate 3 in the combined structure in which the tuning-fork resonator 2 is mounted on the supporting substrate 3 having the first slit 10, as with the case of the above-described structure in which the tuning-fork resonator 51 is mounted on the supporting substrate 52 without a slot.

However, in the combined structure in this preferred embodiment in which the tuning-fork resonator 2 is mounted on the supporting substrate 3 having the first slit 10, it has been determined that although edges (corners) of the outer regions of the substrate components 11 of the supporting substrate 3 vibrate in the directions of arrows illustrated in FIG. 2 and undergo displacement, the substantially central portions of the outer regions of the substrate components 11 do not vibrate. Specifically, when one edge of one of the substrate components 11 moves in one direction (upward) that is substantially perpendicular to the principal planes of the supporting substrate 3, the other edge thereof moves in another direction (downward). With respect to the other one of the substrate components 11, two edges thereof undergo displacement in a direction opposite to the above.

The arrows shown in FIG. 2 represent the directions and the amounts of the displacements of the edges (corners) of the supporting substrate 3 at a certain point in time during operation. As is apparent from FIG. 2, the substantially central portions in outer regions of the supporting substrate 3, i.e., of two sides of the supporting substrate 3, the two sides extending in the longitudinal direction of the prongs 5 of the tuning-fork resonator 2, do not vibrate and do not undergo displacement. These substantially central portions function as non-vibrating portions (nodes) S.

In the combined structure of this preferred embodiment, the non-vibrating portions S are positioned substantially at the centers of the outer regions of the substrate components 11. When the supporting substrate 3 is fixed to the casing 4 at the non-vibrating portions S, vibration does not leak from the supporting substrate 3 to the casing 4. The supporting substrate 3 of this preferred embodiment has the substrate electrodes 13 located substantially at the centers of the outer regions of the substrate components 11, i.e., at the non-vibrating portions S. Therefore, the substrate electrodes 13 do not vibrate, resulting in stable connection of the substrate electrodes 13 and the external leading electrodes 14 of the casing 4.

Consequently, even if vibration leaks from the tuning-fork resonator 2 to the supporting substrate 3, the vibration does not leak from the supporting substrate 3 to the casing 4. As a result, the disadvantages of the known angular velocity sensor described above are eliminated. Additionally, the ability to fix the outer regions of the supporting substrate 3 in this preferred embodiment advantageously facilitates mounting of other necessary units in the casing 4 or miniaturization of the angular velocity sensor.

In this preferred embodiment, the support 6 is preferably provided with the unitary prongs of the tuning-fork resonator 2. However, the structure is not limited to this. For example, as shown in FIG. 4B, a connection portion (6) that is substituted for the above-described unitary support 6 may function as a base for fixing the base ends of the prongs 5. As shown in FIG. 4C, another support 6 integrated with the prongs 5 may function as a base for fixing the base ends of the prongs 5.

In the tuning-fork resonator 2 shown in FIG. 4A and FIG. 4C, the base ends of the pair of the prongs 5 are fixed to the support 6, and therefore, the process of forming the slit 7 can be continuously carried out. As a result, the process of forming is advantageously simplified. The tuning-fork resonator 2 is not limited to a bimorph type. The tuning-fork resonator 2 may be a unimorph type. The tuning-fork of the tuning-fork resonator 2 may be a single-crystal tuning-fork, such as a quartz tuning-fork. The tuning-fork resonator 2 may be a composite of a metal tuning-fork and a piezoelectric element bonded thereto.

Second Preferred Embodiment

Figure 6:
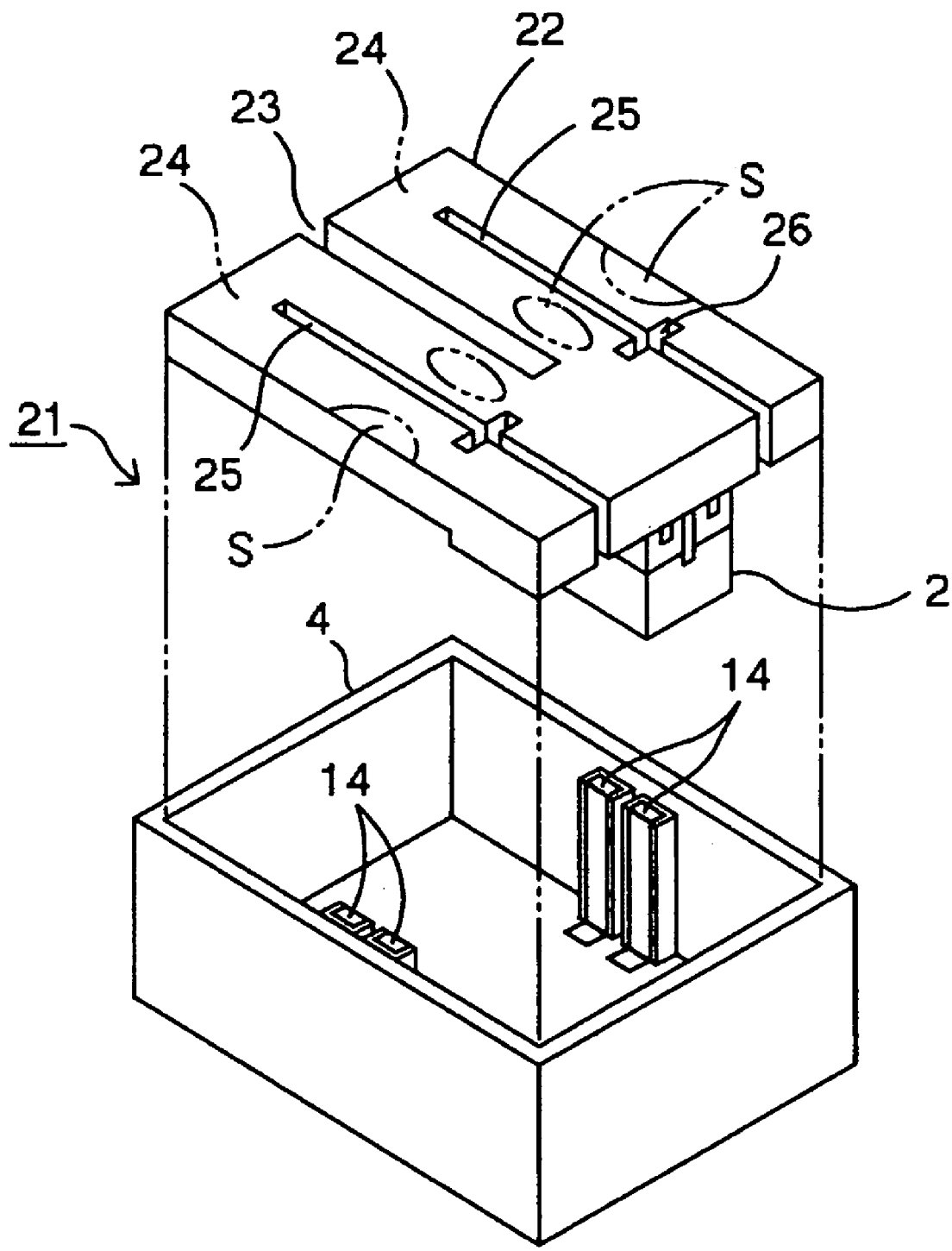
FIG. 6 is an exploded perspective view showing the overall structure of an angular velocity sensor according to a second preferred embodiment of the present invention.
Figure 7:
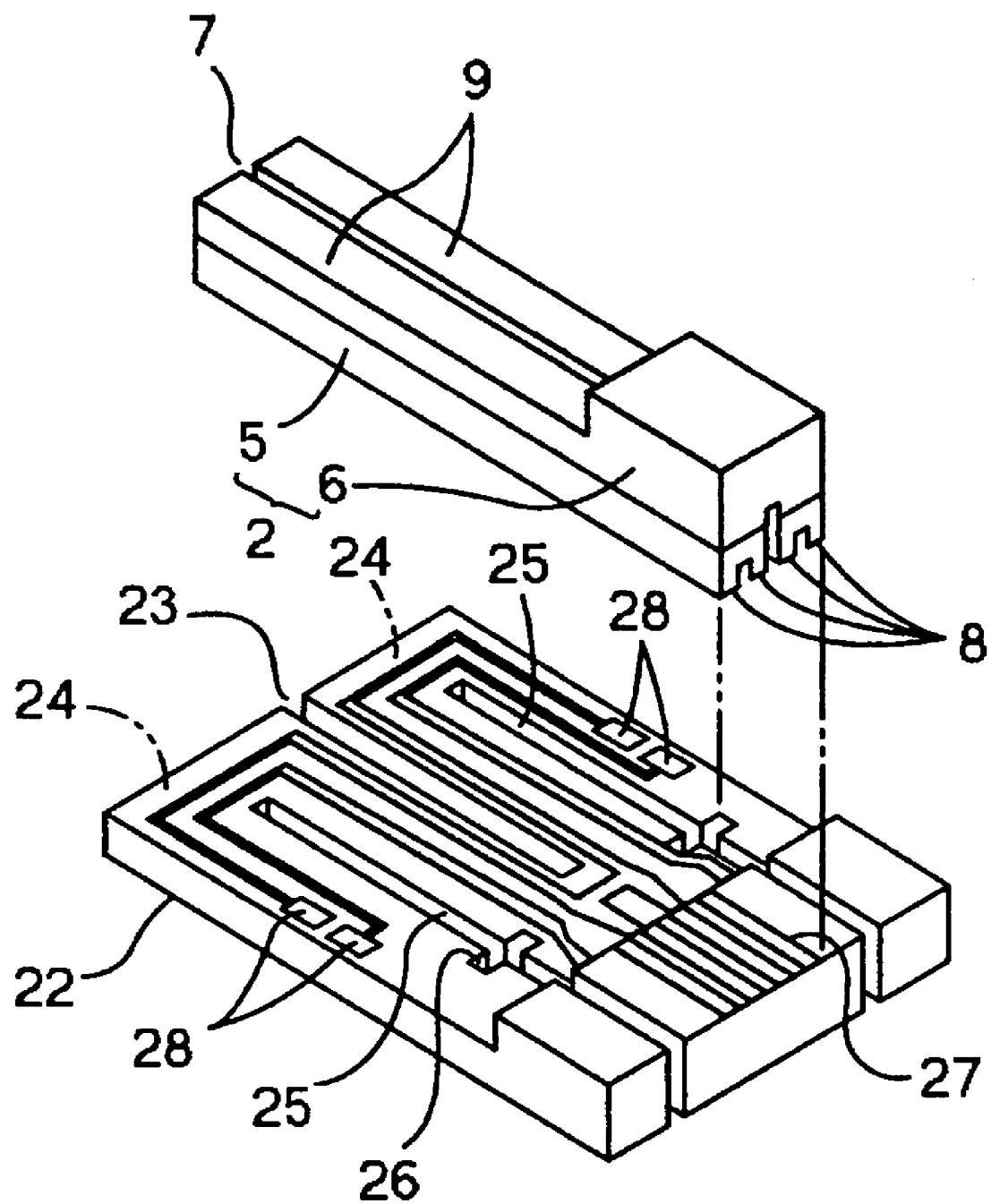
FIG. 7 is an exploded perspective view showing a combined structure of a tuning-fork resonator and a supporting substrate that are included in the angular velocity sensor according to the second preferred embodiment of the present invention.
Figure 8:
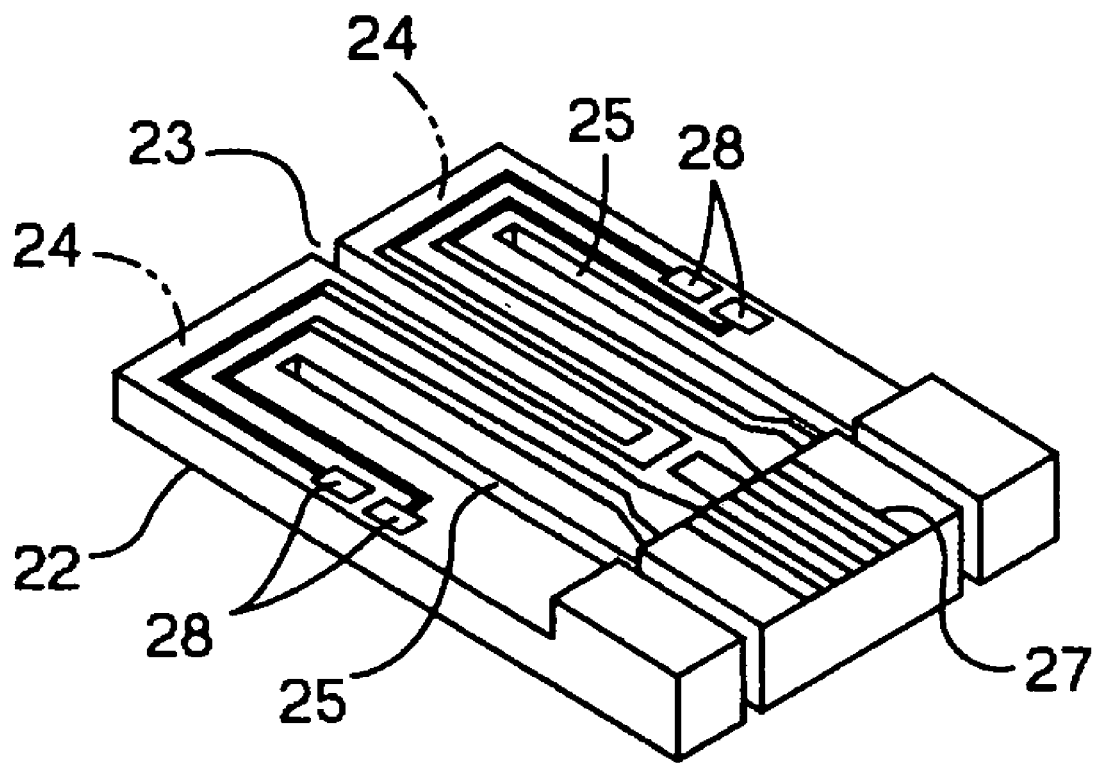
FIG. 8 is an external perspective view of a modification of the supporting substrate included in the angular velocity sensor according to the second preferred embodiment of the present invention.

FIG. 6 is an exploded perspective view showing the overall structure of an angular velocity sensor according to a second preferred embodiment of the present invention. FIG. 7 is an exploded perspective view showing a combined structure of a tuning-fork resonator and a supporting substrate included in the angular velocity sensor. FIG. 8 is an external perspective view of a modification of the supporting substrate included in the angular velocity sensor.

The overall structure of an angular velocity sensor 21 of the second preferred embodiment is basically the same as that of the angular velocity sensor 1 of the first preferred embodiment. Therefore, in FIGS. 6 to 8, the same reference numerals have been used as in FIGS. 1 to 5 for similar units and elements, and detailed explanations thereof are omitted. FIG. 6 illustrates the combined structure of the tuning-fork resonator 2 and a supporting substrate 22, as seen from the back side.

As shown in FIG. 6, the angular velocity sensor 21 has the tuning-fork resonator 2 including the pair of prongs 5 and the support 6, which is a base for fixing the base ends of the prongs 5, the supporting substrate 22 supporting the prongs 5 of the tuning-fork resonator 2 at the base ends of the prongs 5 so that the prongs 5 can vibrate, and the casing 4 accommodating the tuning-fork resonator 2 by fixing the supporting substrate 22 to the casing 4. As shown in FIGS. 6 and 7, the supporting substrate 22 has a first slit 23 formed in the longitudinal direction of the prongs 5. The first slit 23 is open at one end substantially at the center of one of two sides substantially perpendicular to the longitudinal direction of the prongs 5 of the tuning-fork resonator 2 and divides the supporting substrate 22 into substrate components 24 corresponding to the prongs 5.

The substrate components 24 of the supporting substrate 22 have second slits 25 which are preferably substantially parallel to the first slit 23, and each of the second slits 25 is open at one end in the other side opposite to the one side in which the first slit 23 opens. The substrate components 24 have second notches 26 intersecting substantially at the centers of the second slits 25 in the longitudinal direction and extending in the lateral direction of the prongs 5 of the tuning-fork resonator 2, in addition to the first slit 23 and the second slits 25. As in the modification shown in FIG. 8, the supporting substrate 22 may have only the first slit 23 and the second slits 25 without any notches.

Circuit patterns 27 are preferably provided on one surface of the supporting substrate 22 so that the circuit patterns 27 are bonded to the driving external electrodes 8 of the tuning-fork resonator 2. A pair of substrate electrodes 28 is disposed on each of the substantially central portions of outer regions of the substrate components 24, i.e., of two sides of the substrate components 24 in the longitudinal direction of the prongs 5 of the tuning-fork resonator 2. The substrate electrodes 28 individually come into contact with the external leading electrodes 14 provided on the casing 4 and are brought into conduction.

According to a vibration analysis using the finite-element method conducted by the inventors of the present invention and others, it has been established that a certain amount of asymmetrical out-of-plane vibration leaks from the tuning-fork resonator 2 to the supporting substrate 22 in the combined structure of the tuning-fork resonator 2 and the supporting substrate 22 having the first slit 23 and the second slits 25 in the angular velocity sensor 21 of the second preferred embodiment of the present invention.

In this combined structure, however, as shown in FIG. 6, it has been determined that although edges of the outer regions of the substrate components 24 of the supporting substrate 22 vibrate substantially about the centers of the outer regions of the substrate components 24, the substantially central portions of the outer regions of the substrate components 24 do not vibrate and are identified as non-vibrating portions S. It has been also determined that although both edges of each of the sections defined between the first slit 23 and the second slits 25 vibrate substantially about the centers of the sections, the substantially central portions of the sections do not vibrate and function as the non-vibrating portions S.

As a result, when the supporting substrate 22 is fixed to the casing 4 at the non-vibrating portions S, vibration does not leak from the supporting substrate 22 to the casing 4. Therefore, the substrate electrodes 28 formed on the non-vibrating portions S positioned at the outer regions of the substrate components 24 of the supporting substrate 22 do not vibrate, resulting in stable connection of the substrate electrodes 28 and the external leading electrodes 14 of the casing 4.

In the supporting substrate 22 included in the angular velocity sensor 21 of the second preferred embodiment, the substantially central portions of the sections defined between the first slit 23 and the second slits 25 in the substrate components 24 function as the non-vibrating portions S. Therefore, the supporting substrate 22 can be fixed to the casing 4 at these non-vibrating portions S. When the supporting substrate 22 is fixed to the casing 4 at the four non-vibrating portions S, the following advantages are achieved: the four driving external electrodes 8 of the tuning-fork resonator 2 can be individually led to the casing 4, and the areas of individual fixing points required for fixing the supporting substrate 22 to the casing 4 with the four non-vibrating portions S can be reduced and thus the vibration leakage can be further reduced.

The angular velocity sensor of various preferred embodiments of the present invention may be used for correcting errors caused by camera shake in a video camera, a still camera, a digital camera, or the like, and may be mounted in a car navigation system, a rollover sensor, or the like.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the invention which fall within the true spirit and scope of the invention.

What is claimed is:

1. An angular velocity sensor comprising:
a tuning-fork resonator having a pair of prongs arranged substantially parallel with each other, base ends of the prongs being fixed and constituting a base;
a supporting substrate mounting the tuning-fork resonator so that a principal surface of the supporting substrate and a principal surface of the tuning-fork resonator are opposed to each other, the principal surface of the tuning-fork resonator being a surface defined by a longitudinal direction and a lateral direction of the prongs, the supporting substrate supporting the prongs at the base so that the prongs vibrate; and
a casing accommodating the tuning-fork resonator by fixing the supporting substrate to the casing; wherein
the supporting substrate has a first slit opening at one end substantially in the center of a side that is substantially perpendicular to the longitudinal direction of the prongs of the tuning-fork resonator, the first slit extending in the longitudinal direction of the prongs, and the first slit dividing the supporting substrate into substrate components corresponding to the prongs, and the substrate components are fixed to the casing at non-vibrating portions present in two sides of the substrate components, the two sides extending in the longitudinal direction of the prongs.

2. The angular velocity sensor according to claim 1, wherein the supporting substrate has a first notch intersecting substantially at the center of the first slit in the longitudinal direction and extending in the lateral direction of the prongs of the tuning-fork resonator.

3. The angular velocity sensor according to claim 1, wherein the substrate components have second slits arranged substantially parallel to the first slit, and each of the second slits is open at one end in the other side opposite to the one side in which the first slit opens.

4. The angular velocity sensor according to claim 3, wherein the substrate components have second notches intersecting substantially at the centers of the second slits in the longitudinal direction and extending in the lateral direction of the prongs of the tuning-fork resonator.

5. The angular velocity sensor according to claim 1, wherein the tuning-fork resonator faces a bottom of the casing.

6. The angular velocity sensor according to claim 1, wherein the tuning-fork resonator is a bimorph resonator.

7. The angular velocity sensor according to claim 1, wherein the tuning-fork resonator is a unimorph resonator.

8. The angular velocity sensor according to claim 1, further comprising a pair of driving external electrodes each being arranged on a respective one of the pair of prongs.

9. The angular velocity sensor according to claim 1, further comprising circuit patterns arranged on a surface of the supporting substrate.

10. The angular velocity sensor according to claim 1, wherein a width of the first slit is larger than the tuning-fork resonator.

11. The angular velocity sensor according to claim 1, further comprising a pair of substrate electrodes disposed on the substrate components.

12. The angular velocity sensor according to claim 1, wherein the slit has a single line configuration.

13. The angular velocity sensor according to claim 1, wherein a tuning-fork of the tuning-fork resonator is one of a single-crystal tuning-fork and a metal tuning-fork having a piezoelectric element bonded thereto.

* * * * *